United States Patent [19]
Shinogi et al.

[11] Patent Number: 6,006,606
[45] Date of Patent: Dec. 28, 1999

[54] SEMICONDUCTOR ACCELERATION SENSOR

[75] Inventors: Masataka Shinogi; Yutaka Saitoh; Kenji Kato, all of Chiba, Japan

[73] Assignee: Seiko Instruments R&D Center Inc., Japan

[21] Appl. No.: 08/844,323

[22] Filed: Apr. 18, 1997

[51] Int. Cl.⁶ .................................................. G01P 15/12
[52] U.S. Cl. ........................................................ 73/514.33
[58] Field of Search ........................ 73/514.33, 514.36, 73/514.38; 338/2, 5, 46

[56] References Cited

U.S. PATENT DOCUMENTS

| | | | |
|---|---|---|---|
| 4,891,982 | 1/1990 | Norling | 73/514.36 |
| 4,891,984 | 1/1990 | Fujii et al. | 73/514.33 |
| 4,969,359 | 11/1990 | Mikkor | 73/514.33 |
| 5,000,817 | 3/1991 | Aine | 156/633 |
| 5,212,986 | 5/1993 | Takeuchi | 73/514.33 |
| 5,343,064 | 8/1994 | Spangler et al. | 257/350 |

FOREIGN PATENT DOCUMENTS

| | | |
|---|---|---|
| 802417A3 | 10/1997 | European Pat. Off. . |
| 261555A2 | 3/1998 | European Pat. Off. . |
| 2725028 | 3/1996 | France . |
| 92/15018 | 9/1992 | WIPO . |

*Primary Examiner*—John E. Chapman
*Attorney, Agent, or Firm*—Adams & Wilks

[57] ABSTRACT

A semiconductor acceleration sensor comprises a sensor element having a first surface for receiving an acceleration force and second opposite surfaces disposed generally perpendicular to the first surface, a support for supporting and fixing the sensor element, and a detecting device disposed on the second opposite surfaces of the sensor element for detecting a variation of a physical quantity due to an acceleration force applied to the first surface of the sensor element.

2 Claims, 18 Drawing Sheets

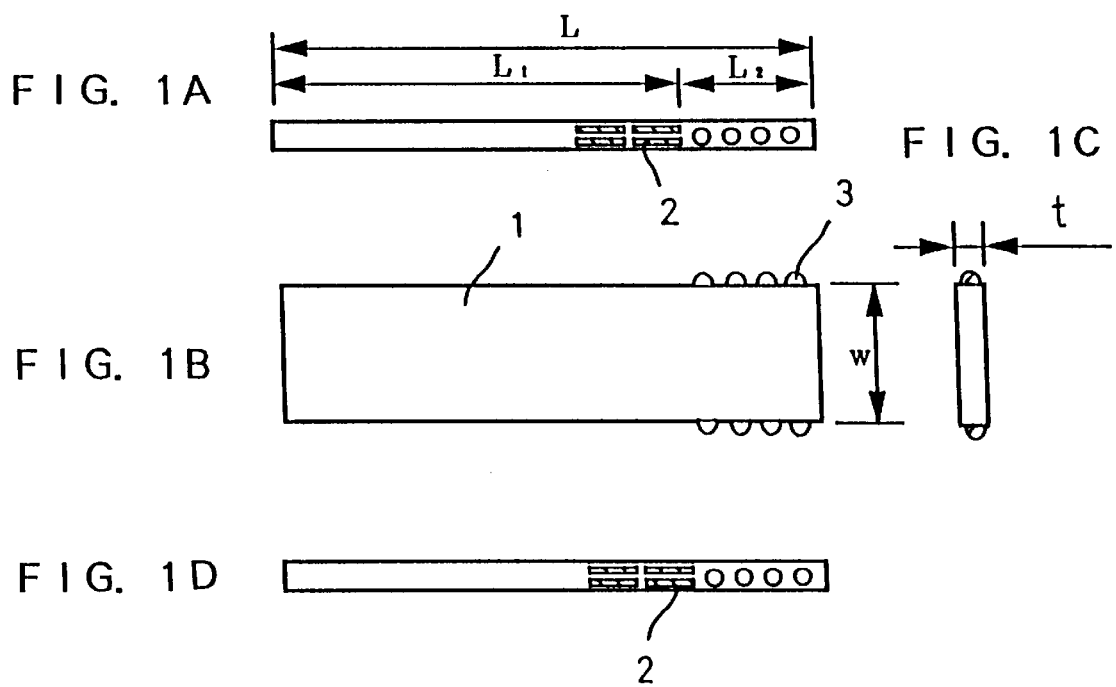

FIG. 9A
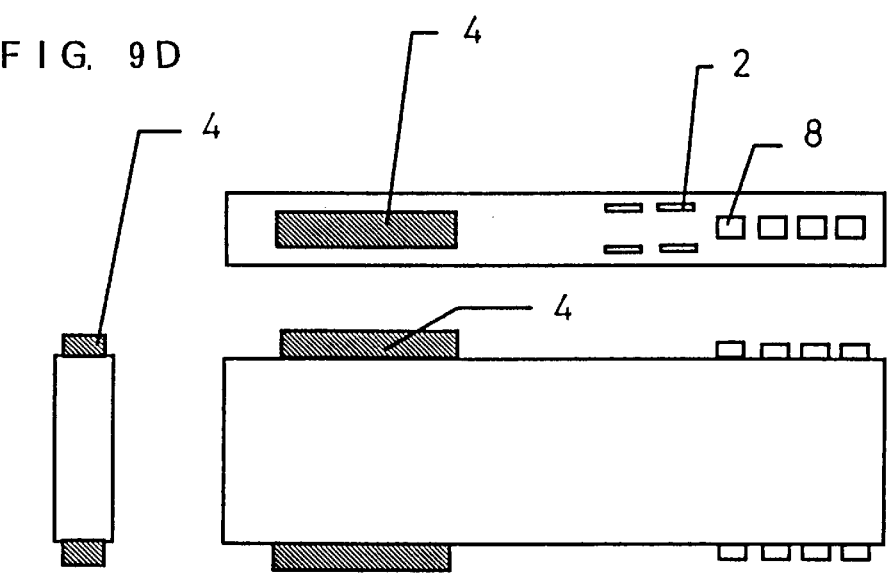
FIG. 9D
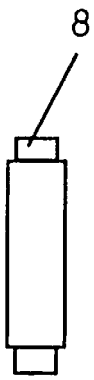
FIG. 9E
FIG. 9B
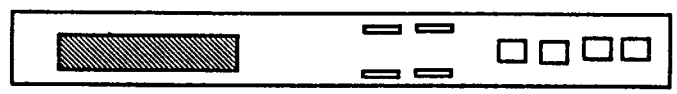
FIG. 9C

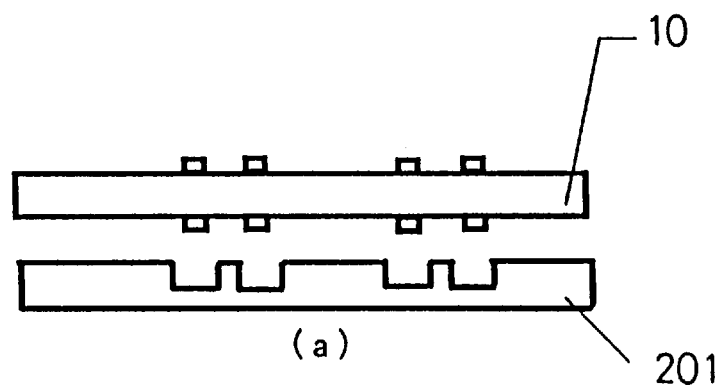
F I G. 1 1A
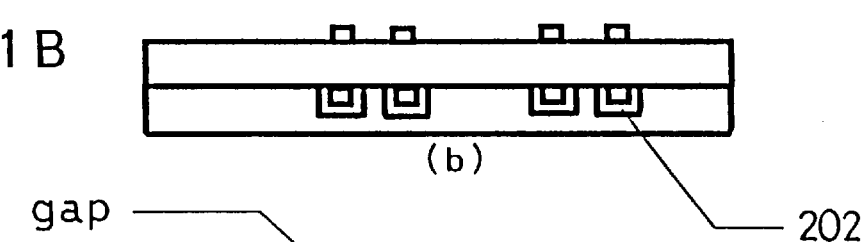
F I G. 1 1B
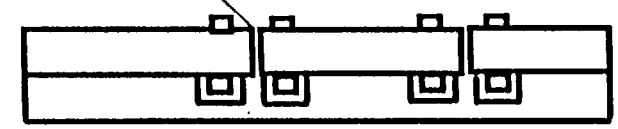
F I G. 1 1C

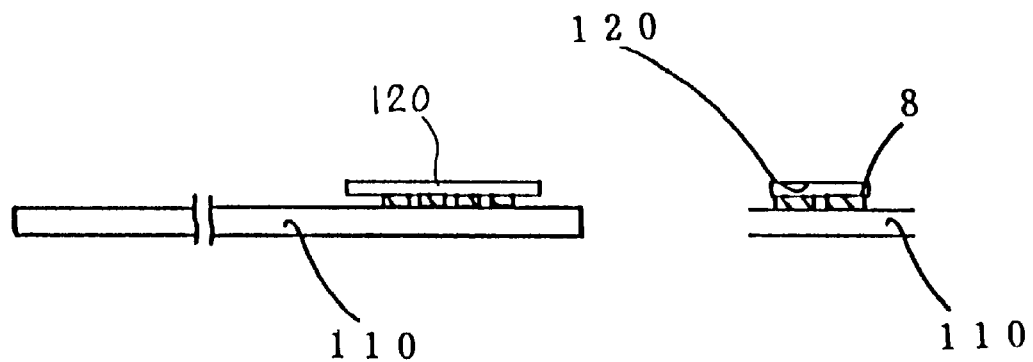
F I G. 1 8 A
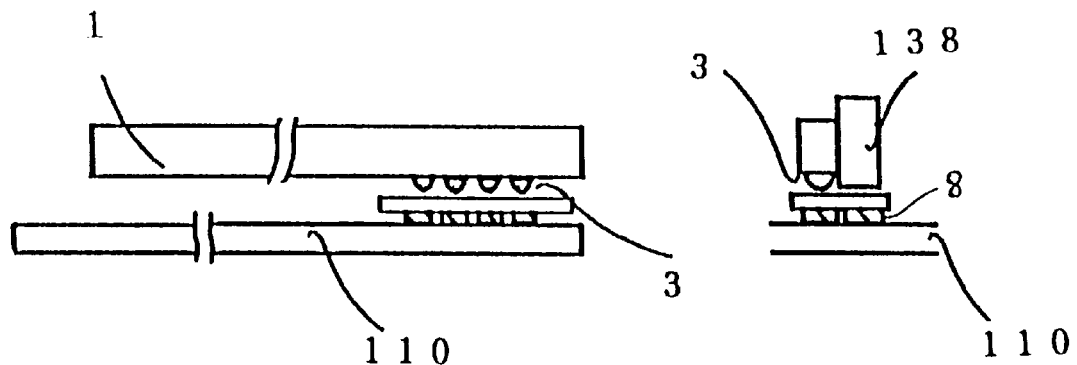
F I G. 1 8 B
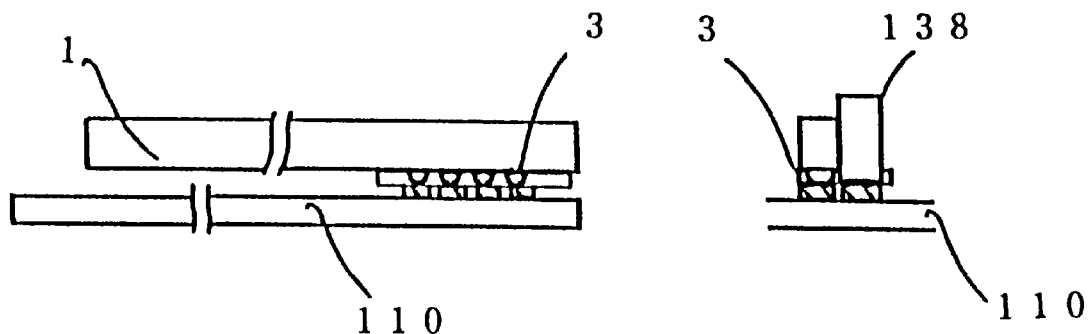
F I G. 1 8 C

SEMICONDUCTOR ACCELERATION SENSOR

BACKGROUND OF THE INVENTION

1. Technical Field of the Invention

The present invention relates to a semiconductor device including a semiconductor acceleration sensor which converts displacement into an electrical signal utilizing the piezoresistance effect of a semiconductor crystal such as silicon.

2. Description of the Prior Art

FIG. 4 shows a semiconductor acceleration sensor produced by micromachining that is disclosed in Japanese Unexamined Patent Publication No. Hei. 1-302167. A cantilever 21 is formed with a groove 23 in the vicinity of a support 24 by etching, so that a thin portion 22 is formed there. Piezoresistors 2 formed on the top surface of the sensor constitute a bridge circuit.

A weight 4 is provided at a tip portion of the cantilever.

As shown in FIGS. 10, Japanese Examined Utility Model Publication No. Hei. 3-20780 discloses an example in which a metal weight is formed by electroplating.

Further, FIG. 15 shows a semiconductor acceleration sensor disclosed in Japanese Unexamined Patent Publication No. Hei. 5-312827. A cantilever sensor element 1 is formed with a groove 23 in the vicinity of a support 24 by etching, so that a thin portion 22 is formed. Piezoresistors 2a, 2b, 2c, and 2d formed on the top surface of the sensor constitute a bridge circuit. The piezoresistors 2b and 2d which serve as reference resistors are disposed on the support 24. The piezoresistors 2a and 2c which serve as variable resistors for detecting the deformation amount of the thin portion 22 are so arranged as to be perpendicular to the reference resistors.

When the sensor element 1 of the cantilever receives acceleration, it is displaced, so that the resistance values of the piezoresistors 2a and 2c increase. Differences between the resistances of the piezoresistors 2a and 2c and those of the reference resistors 2b and 2d cause a voltage corresponding to the acceleration. This voltage is supplied to a semiconductor integrated circuit substrate 110 that is provided externally via wires 116, which performs signal processing such as amplification of a very small voltage and temperature compensation.

Further, FIG. 16 shows an example disclosed in Japanese Unexamined Patent Publication No. Hei. 6-331647 in which a cantilever sensor element 1 is formed by micromachining. In this example, signal processing circuits such as a detection circuit and an EEPROM are formed on a rim 113 that surrounds the cantilever of the sensor element 1, to compensate for the output characteristics of the sensor.

In the conventional semiconductor acceleration sensors, a set of piezoresistors for detecting acceleration which are provided on the surface constitute a bridge circuit as shown in FIG. 4.

In the acceleration sensor, the sensitivities in directions (other-axes directions) other than the detection axis need to be reduced. In the typical sensor configurations described above, no measures are taken to reduce the sensitivities in the other-axes directions.

The sensitivities in the other-axes directions result from an inclination of the sensor element which is introduced when the sensor element is fixed to a base, a deviation between the centers of gravity of the weight and the sensor element, and other factors.

In the case of Japanese Unexamined Utility Model Publication No. Sho. 61-102871 (see FIG. 5), weights 4 are provided on both top and bottom surfaces of a tip portion of a cantilever 21 of a sensor element so that the center of gravity of the two weights as a whole coincides with the center of the cantilever in the thickness direction. This indicates how important the positional relationship between the centers of gravity of the sensor element 1 and the weights 4 is.

In the methods of adding the weight 4, the weight 4 needs to be disposed at the center of gravity of the sensor element having the piezoresistors. However, a positional deviation of the weight 4 deteriorates the characteristics because torsional stress on the sensor element is increased and acceleration comes to be detected in directions other than the detection axis. This is other-axes sensitivity characteristic of the acceleration sensor. The acceleration detection in directions other than the detection axis is a cause of erroneous operation.

As described above, as far as the characteristics of the acceleration sensor are concerned, it is necessary that the sensor element should not be influenced by torsion and the like.

In addition, in the conventional acceleration sensors, the weight is attached to an end portion of the sensor element with an adhesive or the like. This causes major problems that the number of manufacturing steps increases and that there may occur a positional deviation between the centers of gravity of the sensor element and the weight. It is important to decrease a positional deviation of the weight from the sensor element.

Turning to another aspect of the semiconductor acceleration sensor as shown in FIG. 15, in order, to increase the functionality of the sensor, it is necessary to connect the semiconductor integrated circuit substrate 110 for signal processing to the output stage of the sensor.

In general, an output voltage from the acceleration sensor which is caused by displacement due to acceleration is several millivolts. Therefore, connection to an amplifier circuit 111 is highly necessary. Further, since the strain sensing portion consists of the piezoresistors, a temperature variation occurs. This necessitates a temperature compensation circuit.

Conventionally, the sensor element 1 and the semiconductor integrated circuit substrate 110 for signal processing are disposed adjacent to each other and connected together by wire bonding using wires 116. In this case, because a very small signal is picked up, there is a possibility that noise is superimposed on the signal through the wires 116.

An object of the invention is to reduce this type of noise. Further, the invention is intended to lower the cost by making the material of the conventionally used support 24 unnecessary by using the semiconductor integrated circuit substrate 110 as the support 24.

Japanese Unexamined Patent Publication No. Hei. 4-6471 discloses an example in which a voltage variation occurring in piezoresistors of a cantilever sensor element 1 due to acceleration is supplied to a semiconductor integrated circuit substrate 110 as a weight provided at the other end and incorporating an amplifier circuit 111, and signal processing is performed in the semiconductor integrated circuit substrate 110. The cantilever sensor element 1 and the semiconductor integrated circuit substrate 110 are connected to each other via bumps 3. An outer lead 130 is electrically connected to the cantilever sensor element 1 with a wire 116. This example is shown in FIG. 17. In this method, since the semiconductor integrated circuit substrate 110 deals with very small, high-frequency signals, noise is likely to occur.

Further, as shown in the top view of FIG. 16, Japanese Unexamined Patent Publication No. Hei. 6-331647 discloses the example in which the signal processing circuit 112 is formed on the periphery of the sensor element 1. In this case, the cantilever as the sensor element 1 is formed by etching while the semiconductor integrated circuit on the periphery is protected from an etching liquid. This results in an increase in the number of manufacturing steps, and is therefore an obstruction to cost reduction. There is an additional problem of a reduction in yield.

The inventor has been made to solve the above problems. An object of the invention is therefore to reduce noise and attain high performance by directly joining together the sensor element 1 and the semiconductor integrated circuit substrate 110 for signal processing without using the wires 116 or the like, as well as to lower the cost by using the semiconductor integrated circuit substrate 110 as the support 24.

SUMMARY OF THE INVENTION

To solve the above problems, patterns of piezoresistors, output terminals 8, and other parts are formed on both faces of a semiconductor wafer, and a sensor element is constituted by providing acceleration detecting means on the two faces so as to be opposed to each other. The acceleration detecting means on each face is constituted of a bridge circuit, and outputs from the two faces are averaged, whereby torsional stress is reduced and the other-axis sensitivity characteristics of the acceleration sensor is made superior.

As a result, the problem that the fixing accuracy and joining accuracy of the weights 4 should be improved can be solved. Thus, low-price semiconductor acceleration sensors can be supplied at a high yield.

Further, since the patterns can be formed on both surfaces (front and back surfaces) of a semiconductor substrate, weights are formed on both side faces perpendicular to the acceleration detecting faces, whereby the center-of-gravity positions of the sensor element and the weights can be made coincident with each other. This configuration prevents detection of acceleration from other axes.

Further, to solve the above problems, a sensor element is fixed such that a rectangular parallelepiped structural body including piezoresistors is directly fixed to a semiconductor integrated circuit substrate from a semiconductor wafer. In this manner, by using the semiconductor integrated circuit substrate as the support 24 for supporting the sensor, it becomes possible to supply semiconductor devices which are resistant to noise, highly accurate, small in the number of parts, and inexpensive.

Still further, according to the invention, a face of a rectangular parallelepiped sensor element having piezoresistors are connected to a semiconductor integrated circuit through bumps. This allows easy detection of horizontal acceleration.

BRIEF DESCRIPTION OF THE DRAWINGS

FIGS. 9A–9E are plan views of a semiconductor acceleration sensor according to the invention;

FIGS. 11A–11C are process diagrams showing a manufacturing method of the semiconductor acceleration sensor according to the invention;

FIG. 16 is a top view showing the configuration of a conventional semiconductor acceleration sensor;

FIGS. 18A–18C are manufacturing process diagrams of the semiconductor acceleration sensor according to the invention.

DETAILED DESCRIPTION OF THE PREFERRED EMBODIMENTS

Figure 1:
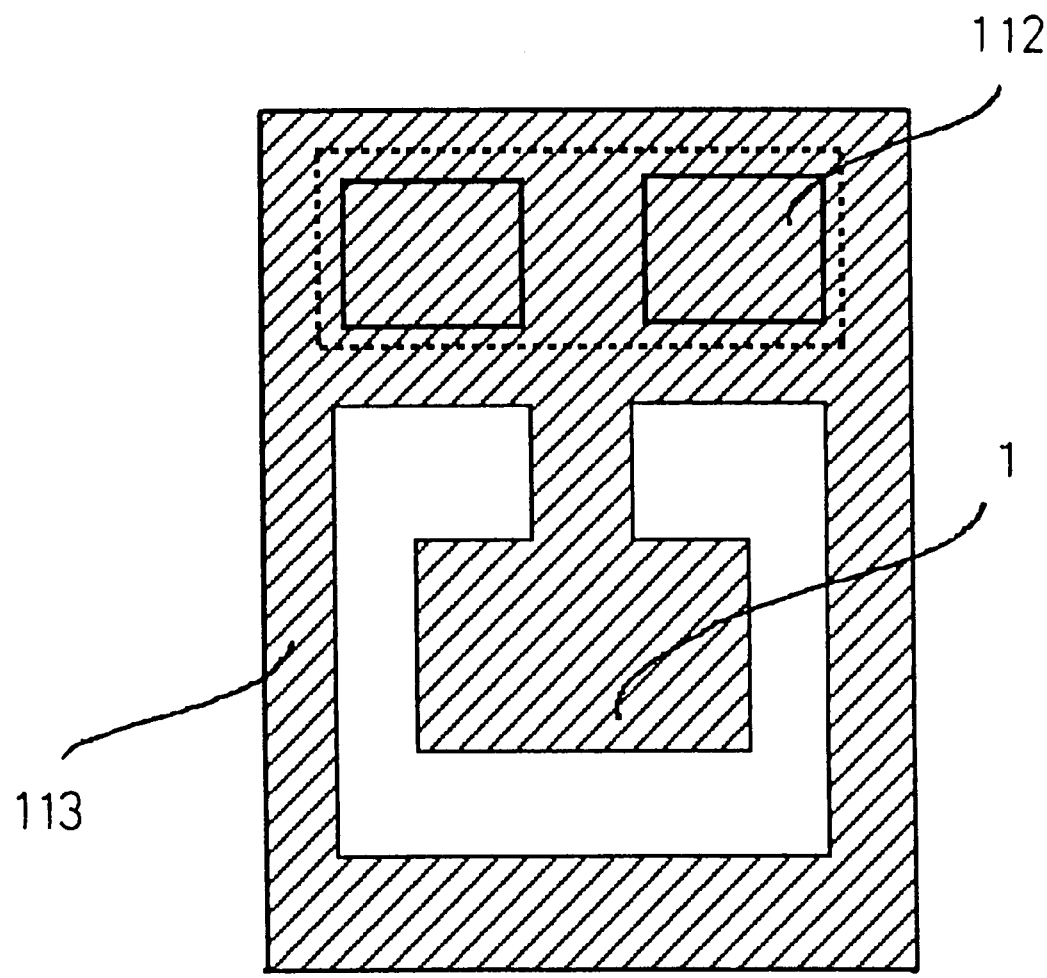
FIGS. 1A–1D are plan views of a semiconductor acceleration sensor according to the present invention.
Figure 17:
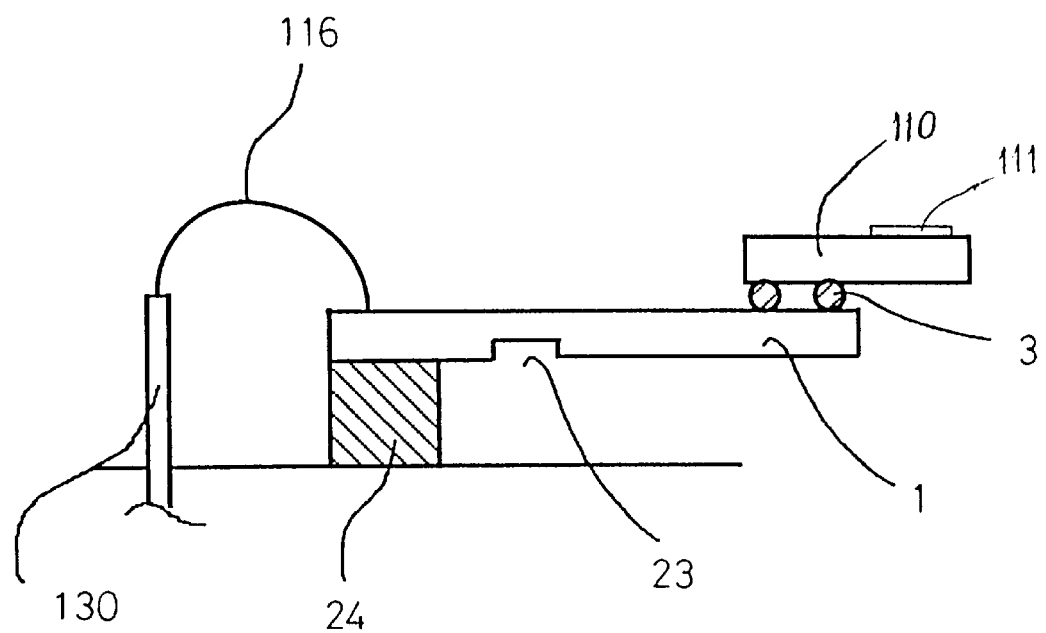
FIG. 17 is a sectional view showing the configuration of a conventional semiconductor acceleration sensor.

The constitution of the present invention will be described in a specific manner with reference to FIGS. 1A–1D FIG. 1A is a right-hand side view of an acceleration sensor according to the invention, FIG. 1B is its top view, FIG. 1C is its front view, and FIG. 1D is a left-hand side view. The semiconductor acceleration sensor is a rectangular parallelepiped structural body that is cut out from a semiconductor wafer 10 and formed with piezoresistors 2, output terminals 8(FIG. 2C), etc. This structural body is hereinafter called a sensor element 1. The piezoresistors 2, the output terminals 8, etc. are patterned on the side faces of the sensor element 1; that is, the piezoresistors 2 and the output terminals 8 exist on both side faces. In this embodiment, the piezoresistors 2 are p-type piezoresistors 2. Bumps 3 for outputting electrical signals are formed on the output terminals 8. In this embodiment, gold bumps 3 are formed. As for the dimensions of the sensor element 1, the length 1 is 6 mm (L1=4 mm, L2=2 mm), the width w is 0.6 mm, and the thickness is 0.12. The bumps 3 on the output terminals 8 have a size of 0.1×0.08 mm and a height of 0.1 mm.

Figure 2A:
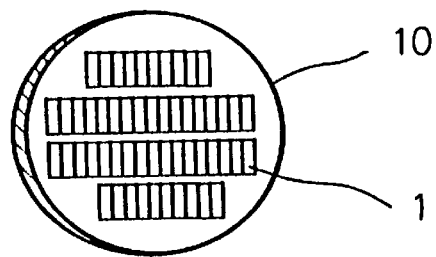
FIGS. 2A–2C are process diagrams showing a method of the semiconductor acceleration sensor according to the invention.
Figure 2B:
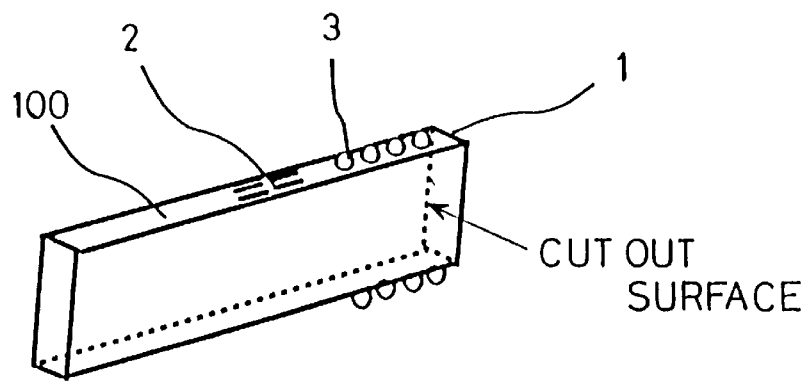
Figure 2C:
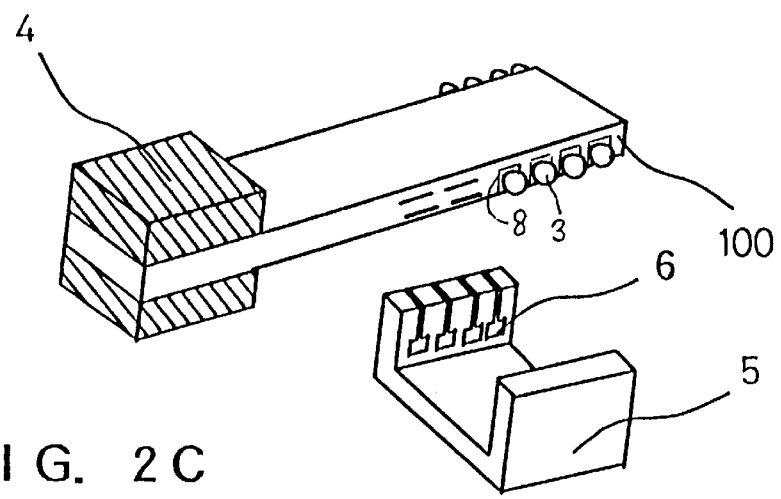
Figure 3A:
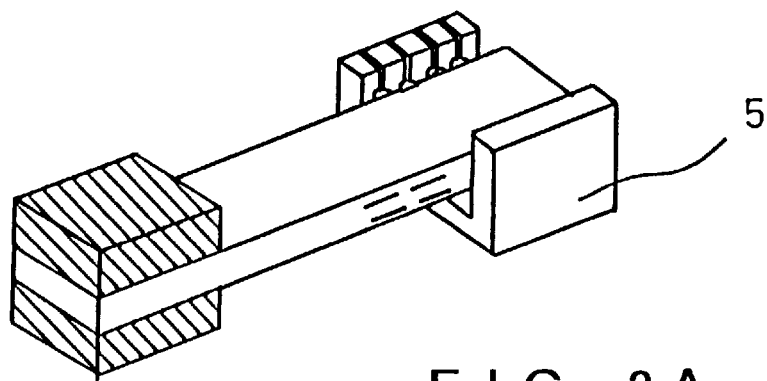
FIGS. 3A–3B are process diagrams showing a manufacturing method of the semiconductor acceleration sensor according to the invention.
Figure 3B:
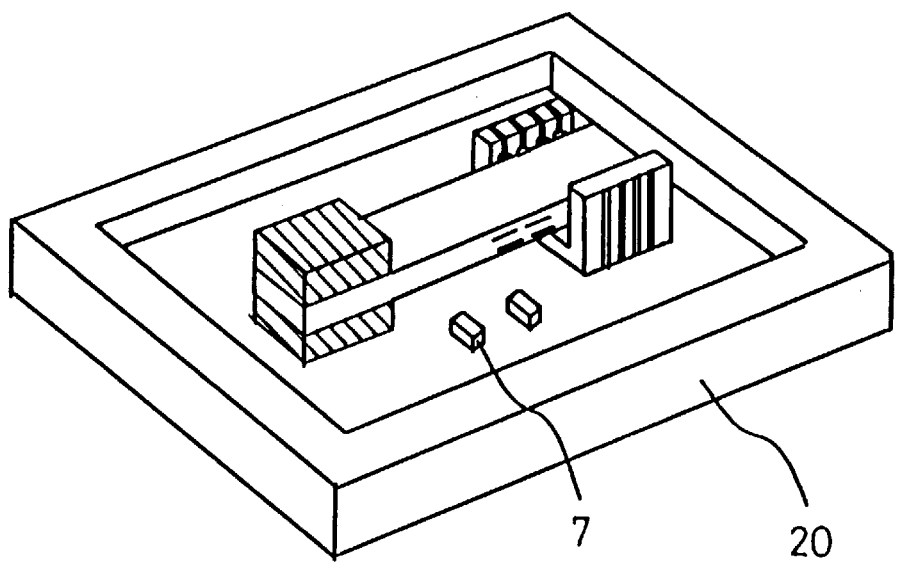
Figure 4:
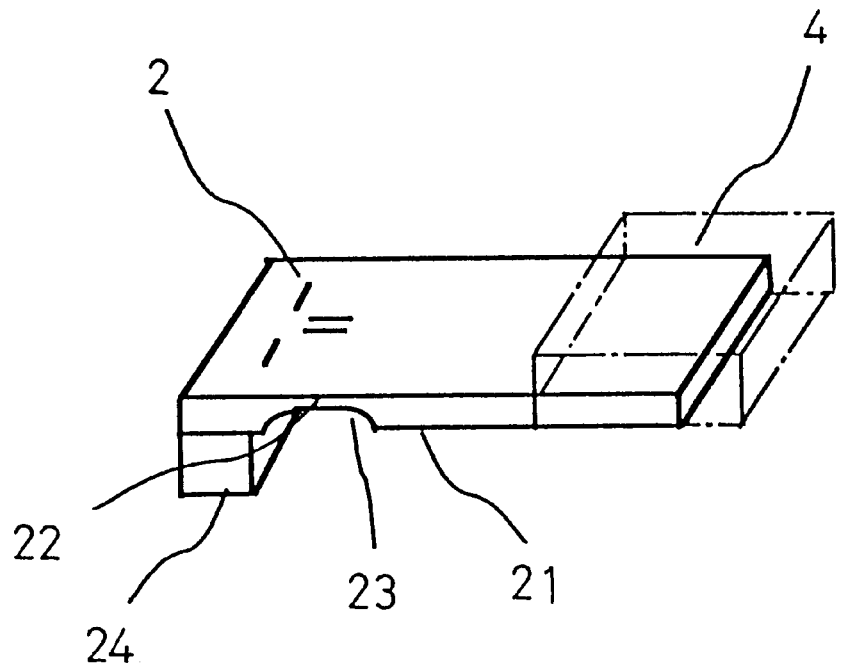
FIG. 4 is a perspective view showing the configuration of a conventional semiconductor acceleration sensor.
Figure 5:
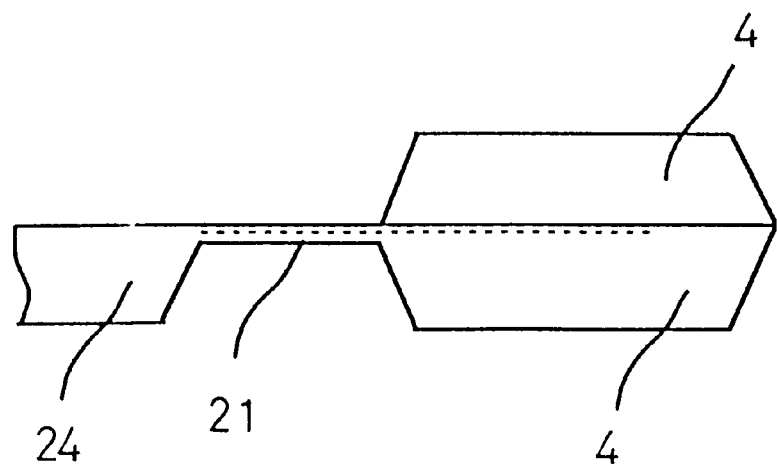
FIG. 5 is a sectional view showing the configuration of a conventional semiconductor acceleration sensor.

As shown in FIGS. 2C and 3B, the semiconductor acceleration sensor is mainly composed of the sensor element 1, a base 5 for taking out electrical signals from the sensor element 1 and for supporting the sensor element 1, weights 4 for providing sensitivity, and a package 20.

A manufacturing method will be described with reference to FIGS. 2 and 3. The piezoresistors 2 and the output terminals 8 are patterned on the semiconductor wafer 10. Scribe lines for cutting out are formed. Further, the gold bumps 3 are formed on the output terminal 8 portions. The above steps are performed on both faces of the semiconductor wafer. It goes without saying that an amplifier circuit, a temperature compensation circuit, and other circuits may be formed during the pattern formation in FIG. 2A.

Next, elements are taken out with a dicing machine with the scribe lines used as a reference. Since the bumps 3 are formed on each element, fixing to the stage of the dicing machine. This embodiment employ fixing with wax. Naturally a tape coated with an adhesive material may be used. The sensor element 1 having the piezoresistors 2 and the output terminals 8 are taken out from the semiconductor wafer in FIG. 2B.

Weights 4 for imparting sensitivity to the sensor element 1 are added. In this embodiment, the weights 4 are made of silicon because it is preferable that the weights 4 be made of a material having the same thermal expansion coefficient as silicon which is the material of the sensor element 1. When it is necessary to increase the sensitivity, a metal such as molybdenum may be used. It is preferable to use, as an adhesive for bonding, an adhesive whose thermal expansion coefficient is close to that of silicon.

The structure in this state is placed on the base 5. To take out electrical information from both side faces 100 of the sensor element 1, wiring lines 6 are formed on the base 5. In this embodiment, ceramics is used. The wiring lines are made of gold. The sensor element 1 is fixed to the base 5 with an adhesive (not shown). In this embodiment, the wiring lines of the base 5 and the sensor element 1 are connected to each other through an anisotropic conductive film. The anisotropic conductive film is an adhesive in which small conductive particles are dispersed. With the anisotropic conductive film, particles are interposed between electrodes by thermo-compression bonding to establish electrical conduction there while insulation between adjacent electrodes is secured. At the same time, mechanical bonding is attained when the adhesive sets. In this manner, conduction between the bumps 3 and the output terminals 8 is obtained through conductive particles. This method is superior because no mechanical stress is exerted on the sensor element 1 in FIGS. 2C and FIG. 3A.

The structure in which the sensor element 1 is attached to the base 5 is mounted on a board. The board is provided with an electrical circuit for picking up information from both side faces 100 of the sensor element 1 and eliminating dislocation due to torsional stress. This embodiment is so configured that a package 20 has functions of the substrate. The package 20 is made of ceramics. Resistors 2 for canceling other-axes sensitivities are formed on the circuit board shown in FIG. 3B.

In the manufacturing method of this embodiment, important items in the manufacturing process for obtaining a semiconductor acceleration sensor having superior characteristics are how to locate the weights 4 at the center of gravity of the sensor element 1 and how to obtain a high degree of orthogonality between the cutting (i.e., dicing) faces and the side faces having the piezoresistors 2 in the sensor element 1. To improve the stability and the yield of manufacture, it is necessary to eliminate torsion due to a positional deviation of the center of gravity and other factors.

In the invention, influences of torsion are canceled by using the electrical circuit, which will be described below.

Figure 6:
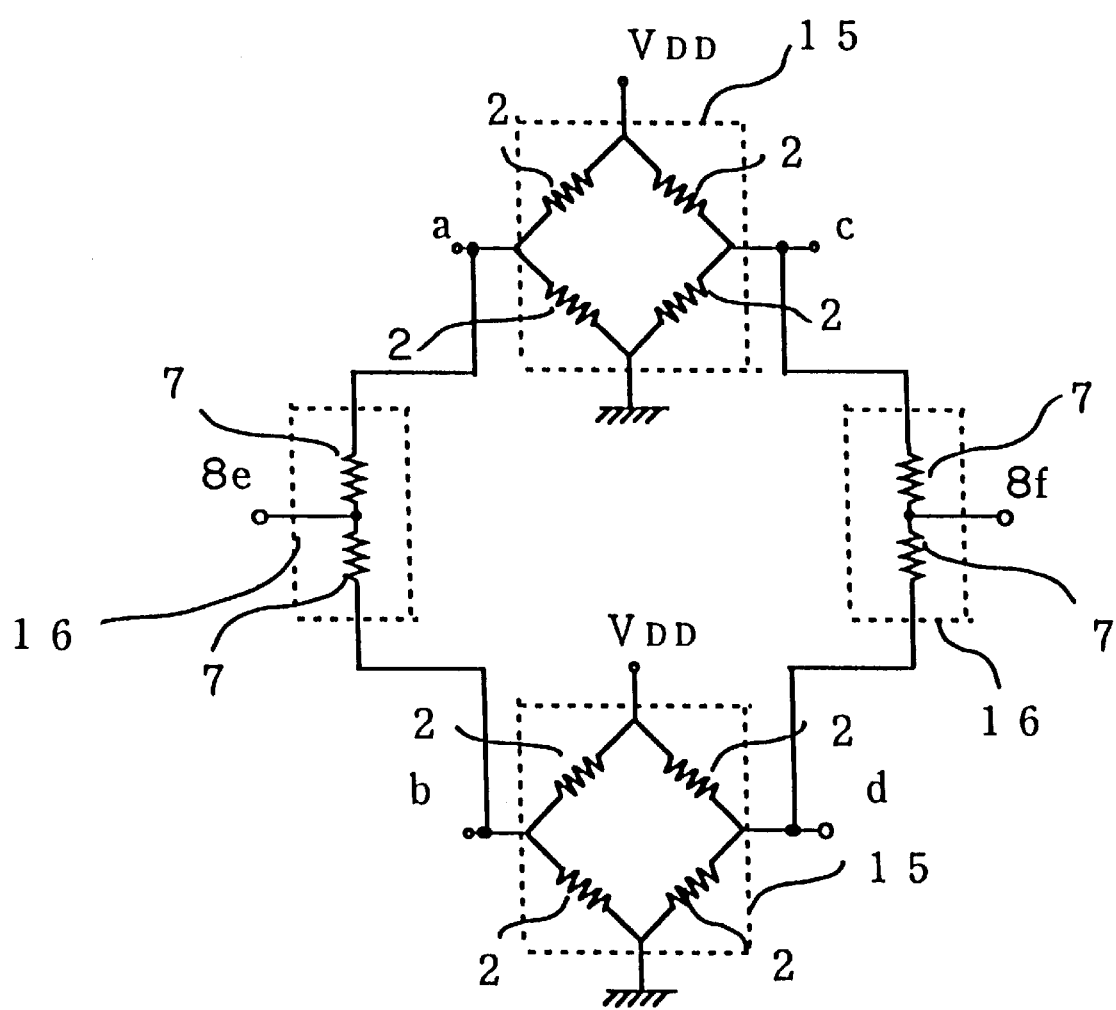
FIG. 6 is an electrical circuit diagram of semiconductor acceleration according to the invention.

A circuit configuration for canceling torsion used in this embodiment will be described with reference to FIG. 6.

Outputs a and b from two bridge circuits 15 formed on both side faces 100 of the sensor element 1 are connected to each other via resistors 7, and a signal is output from an output terminal 8e. Similarly, outputs c and d are connected to each other via resistors 7, and a signal is output from an output terminal 8f. Each of the output signals output from the output terminals 8e and 8f is formed such that the signals from the two bridge circuits 15 are averaged by an averaging section 16 that consists of the resistors 7, to thereby cancel resistance variations of the piezoresistors 2 caused by torsion. As for the resistance values of the respective resistors, the piezoresistors 2 are 1 kΩ and the resistors 7 are 10 kΩ.

That is, the error variation component is reduced by a factor of 1/10. To cancel the influences of torsion in the acceleration sensor, it is preferred that the resistance value of the resistors 7 be set five times or more that of the piezoresistors 2.

As for the flow of electrical signals, electrical signals generated in the sensor element 1 are supplied to the board that is associated with the package via the electrodes of the base 5. The board is provided with the resistors 2 which are chip resistors in the embodiment. The electrical signals are finally supplied to output terminals 8 of the package via the chip resistors.

Figure 7:
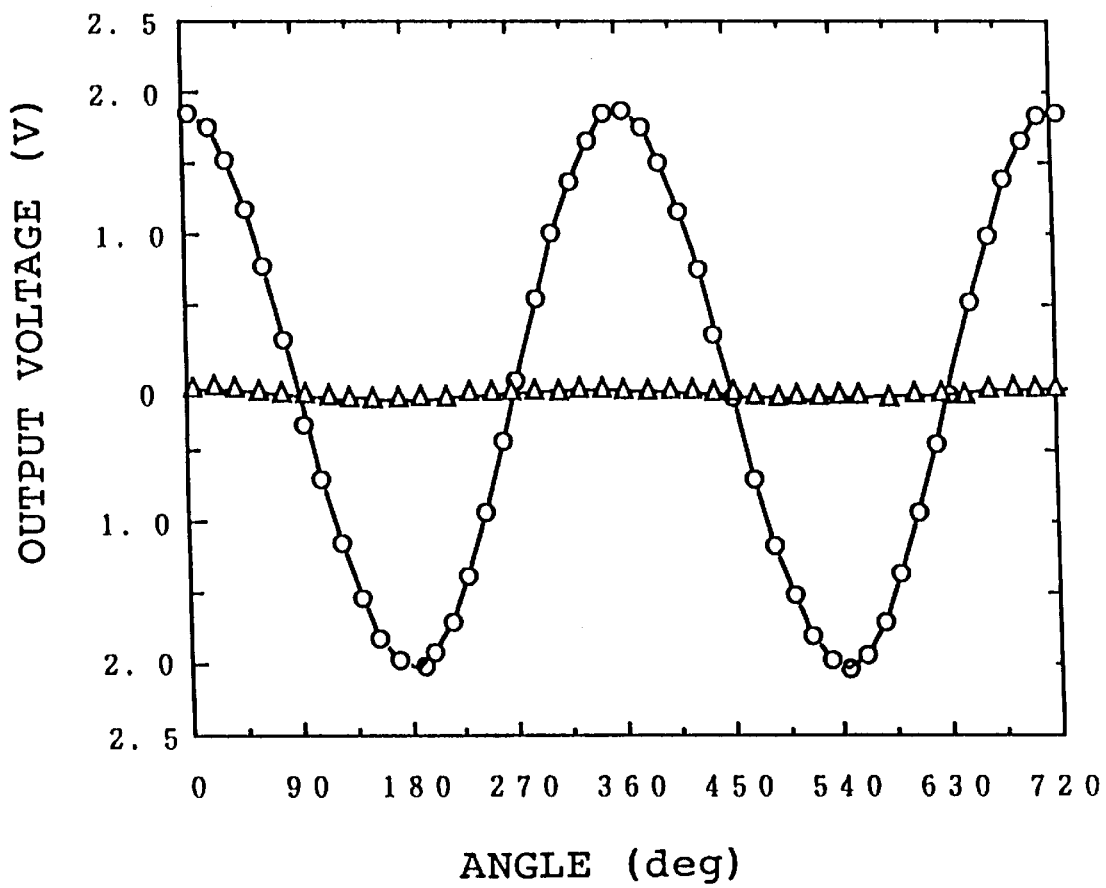
FIG. 7 is a graph showing a semiconductor acceleration output characteristic of the invention.

Output results of this embodiment will be described. FIG. 7 shows output results of this embodiment. A data curve with marks "○" represents data obtained when the acceleration sensor was rotated. When the acceleration sensor receives gravitational acceleration, maximum output voltages are obtained at 0°, 180°, and 360°. The X axis that is the detection axis assumes a sine curve. On the other hand, a Z-axis sensitivity curve with marks "Δ" represents data obtained when the acceleration sensor is rotated with the piezoresistor sides directed to the gravity direction. Ideally, the Z-axis sensitivity should not cause any output. The output sensitivity of the detection axis was 2 V at 180° and 360°, while the data obtained when the acceleration sensor made one rotation with the faces having the piezoresistors 2 directed to the gravitational acceleration direction had an output sensitivity of 20 mV, which is 1% of the output sensitivity of the output sensitivity axis and is superior as the other-axis sensitivity characteristic.

Figure 8:
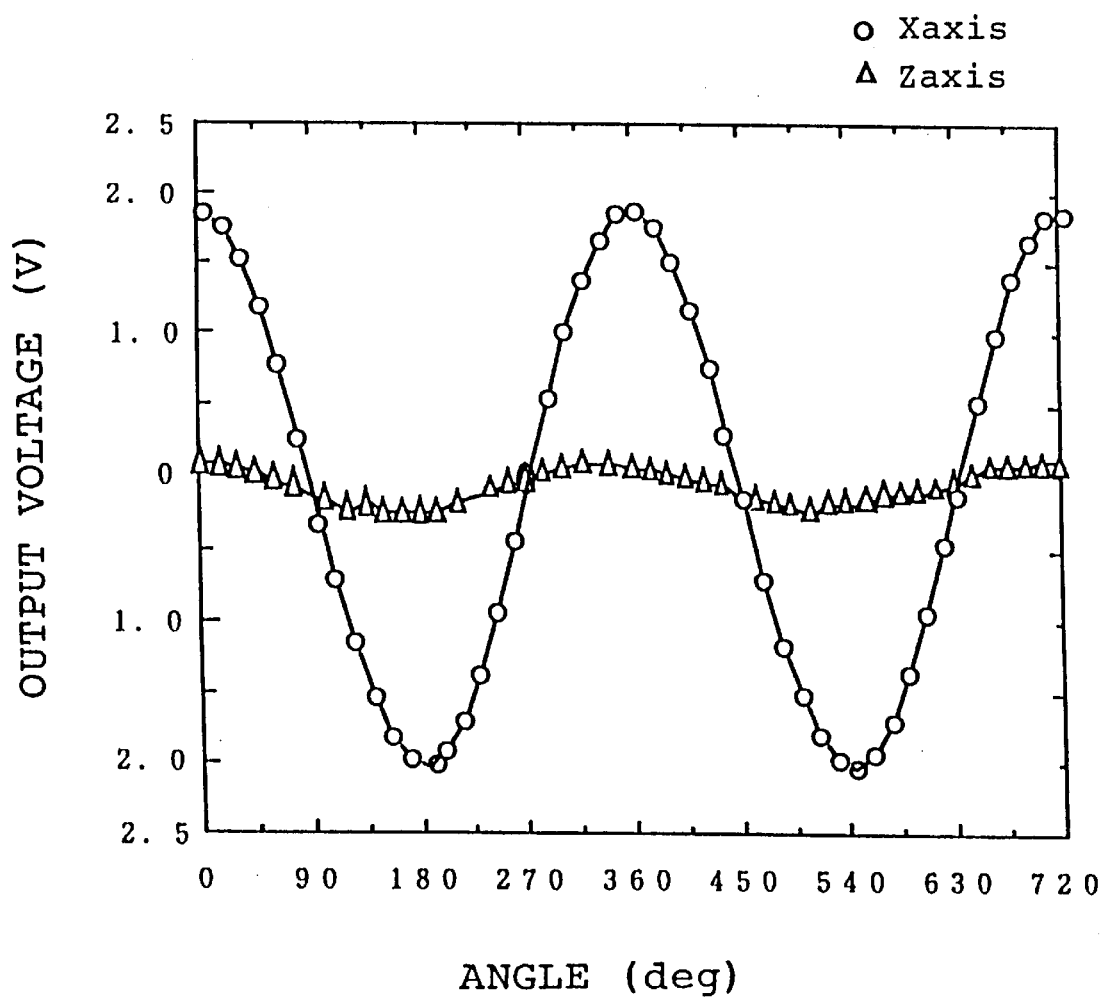
FIG. 8 is a graph showing a conventional semiconductor acceleration output characteristic.
Figure 10A:
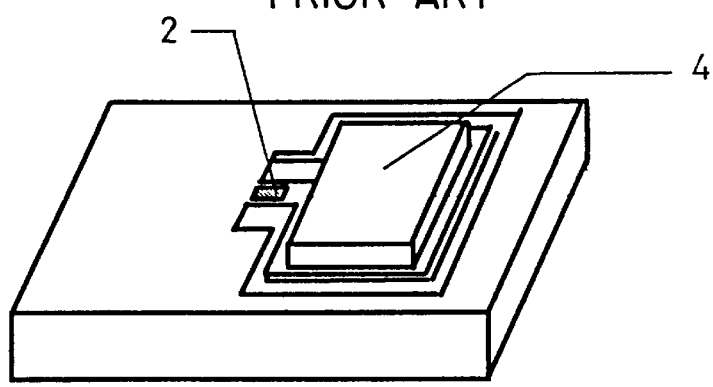
FIGS. 10A–10C are perspective view and sectional views of a conventional semiconductor acceleration sensor.
Figure 10B:
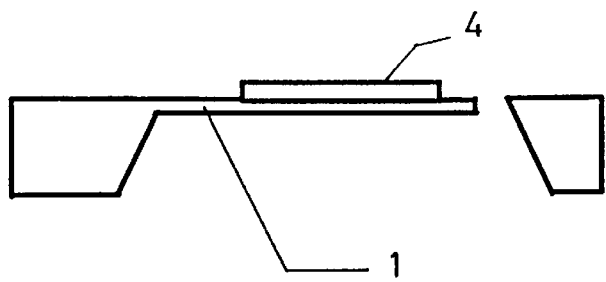
Figure 10C:
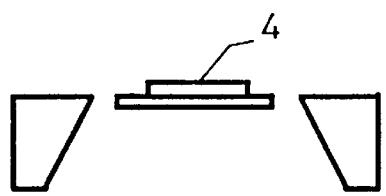

FIG. 8 shows values obtained when the circuit processing of this embodiment was not performed. The other-axis sensitivity value if 10%, which means that the electrical circuit processing of this invention is effective.

As for the other-axis sensitivity characteristics, in a case of apparatuses which perform image processing based on angle detection, such as virtual reality apparatuses, detection of acceleration in an unnecessary direction may cause a problem such as an erroneous operation in which an image moves obliquely. Poor other-axis sensitivity characteristics may cause an erroneous operation also in a case of lifesaving means such as an air-bag.

Next, a description will be made of a configuration for improving other-axes sensitivities and a configuration for simplifying the manufacturing process.

A configuration of the invention in which weights are formed on the faces that are perpendicular to the surfaces for receiving acceleration will be described below in a specific manner. First, as for the manufacturing method, the semiconductor acceleration sensor is a rectangular parallelepiped structural body that is cut out from a semiconductor wafer 10 and formed with piezoresistors 2, output terminals 8, etc.

The piezoresistors 2, the output terminals 8, etc. are patterned on the side faces of the sensor element 1. In the invention, a metal that will become the piezoresistors 2, bumps 3, and weights 4 in the process are formed on both surfaces of the semiconductor 10. The sensor element 1 is taken by cutting out it with a dicing machine. The sensor element 1 is configured such that its side faces are formed with the piezoresistors, output terminals 8, and weights 4. The weights are formed by a method that is similar to a method of forming the bumps 3 used for the output terminals 8. Although gold is formed by gilding, apparently soldering may be used.

The configuration of the invention will be described with reference to FIGS. 9A–9E. FIG. 9B is a top view, FIGS. 9D and 9E are side views, and FIGS. 9A and 9C are front views.

As for the dimensions of the sensor element 1, the length is 10 mm (sensor portion: 7 mm; support: 3 mm), the width w is 0.6 mm, and the thickness is 0.25 mm. As for the shape of the weights formed on both side faces, the length is 4 mm the width is 0.2 mm, and the height is 0.02 mm. The weights weigh 2.4 mg. It is noted that the silicon cantilever portion weighs 1.8 mg and the gold bumps serve as weights of 0.6 mg.

In the invention, the piezoresistors are p-type piezoresistors 2. The bumps 3 for outputting electrical signals are formed on the output terminals 8.

A cutting method by dicing according to the invention will be described below with reference to FIGS. 11. Where bumps exist on both surfaces of a semiconductor wafer, chippings occur in cutting elements by dicing. Chippings are remarkable particularly on the fixed side. In the invention, a dicing jig 201 was produced to lower the degree of chippings, FIG. 11A. The jig is a flat plate having recessed portions. Fixing is effected in a state that the gold bumps of the output terminals 8 and the weight portion are inserted in the recesses FIG. 11B. The semiconductor wafer 10 is fixed to the dicing jig 201 with wax. Since the semiconductor wafer is fixed by this method, sensor elements can be cut out without causing chippings. This method is very efficient because no labor is needed to mount weights in a later step. Further, where the piezoresistors as the detecting section are formed on the side faces with respect to the faces that are directed to the acceleration direction, it is advantageous in being capable of providing a configuration that is hardly affected from other axes.

Figure 12:
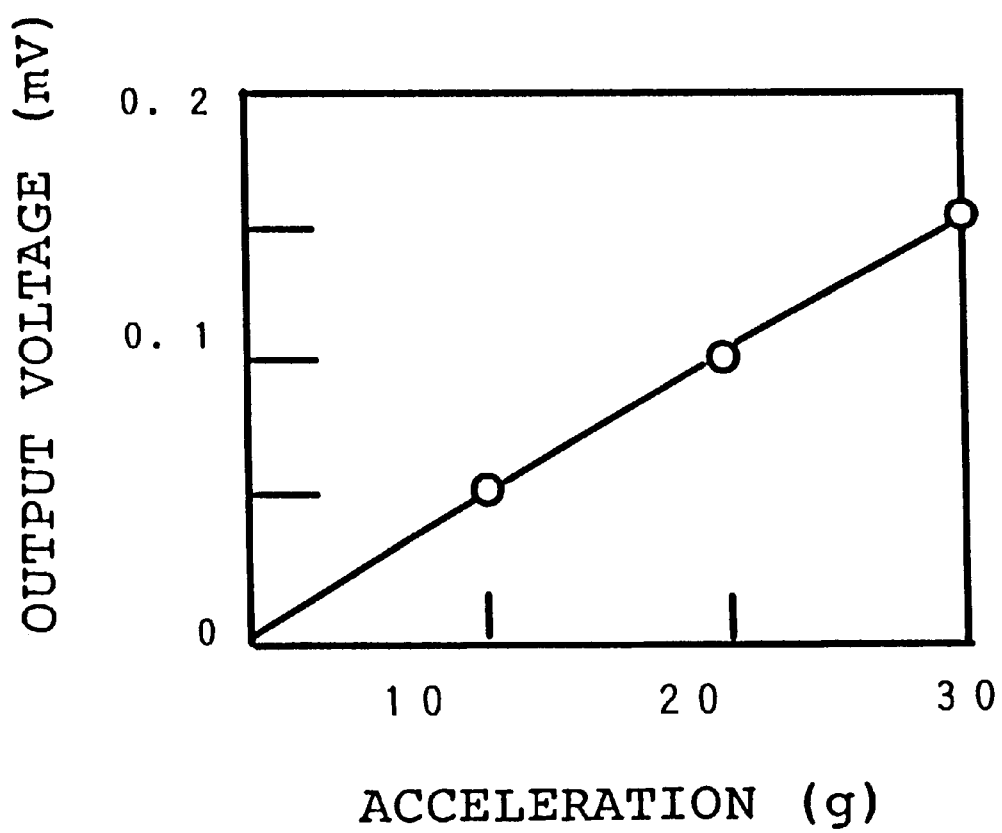
FIG. 12 is a graph showing an output characteristic of the semiconductor acceleration sensor according to the invention.

By using the acceleration sensor of the invention, an output voltage characteristic was measured with acceleration of 30 G. FIG. 12 shows an output voltage characteristic measured. For 30 G, an output voltage of 0.15 mV/G was obtained. By amplifying this voltage by an amplifier circuit, this sensor can be used as a sensor for collision detection for the purpose of an air-bag.

This method realizes an acceleration sensor which can be manufactured easily, though the method is a simple one in which the weights are formed on both side faces with respect to the faces for receiving acceleration.

Next, the invention will be described for an embodiment in which a semiconductor acceleration sensor is manufactured with a semiconductor integrated circuit substrate 110 used as a support.

A specific embodiment of the invention will be hereinafter described with reference to FIG. 13.

Figure 13:
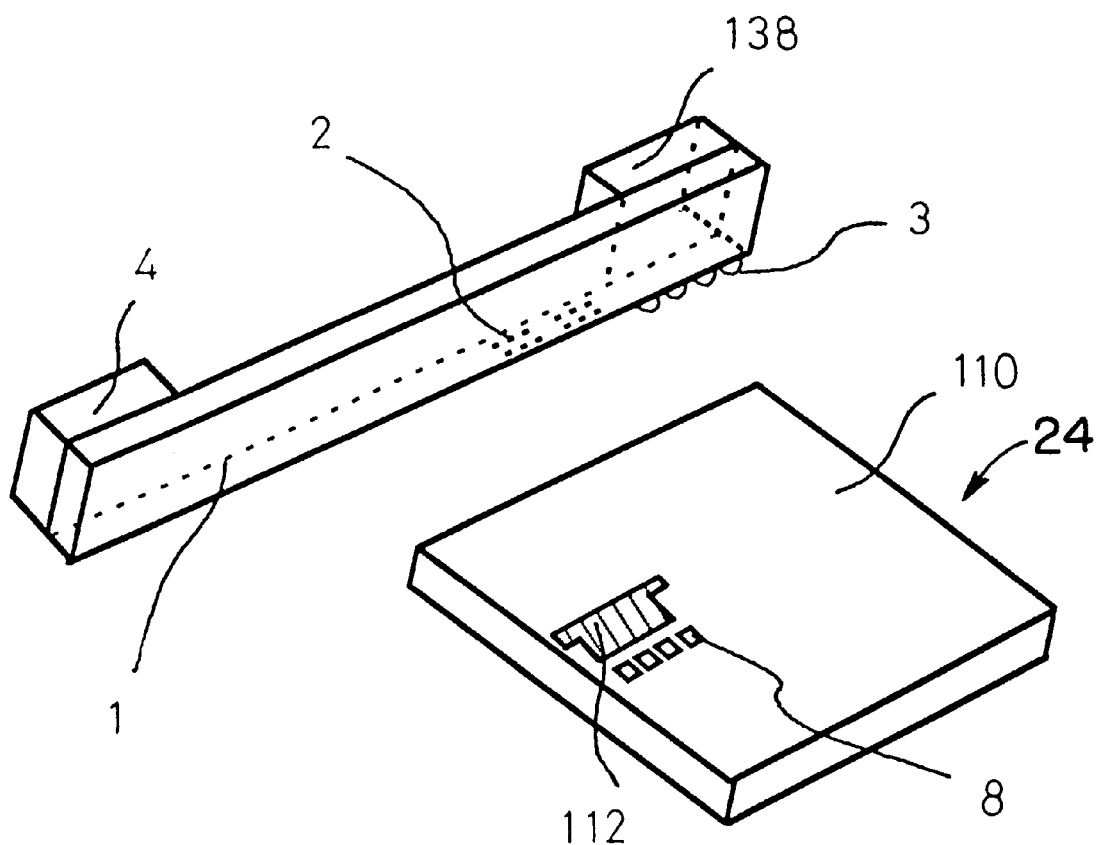
FIG. 13 is a perspective view showing the configuration of semiconductor acceleration sensor according to the invention.

FIG. 13 is a perspective view of a semiconductor acceleration sensor according to the invention.

Figure 19A:
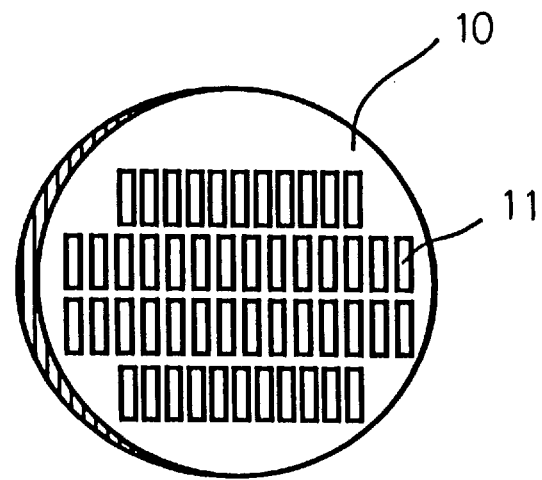
FIGS. 19A–19C are manufacturing process diagrams of the semiconductor acceleration sensor element according to the invention.
Figure 19B:
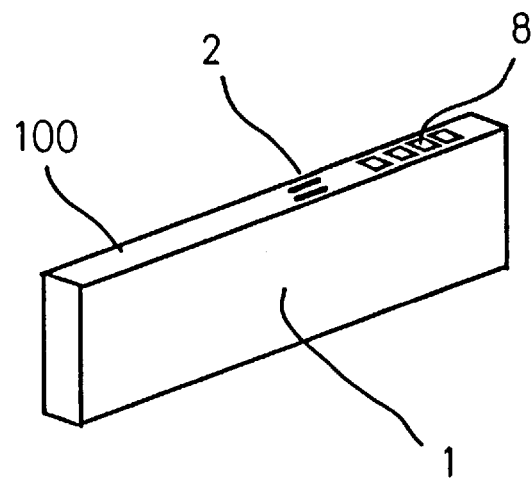
Figure 19C:
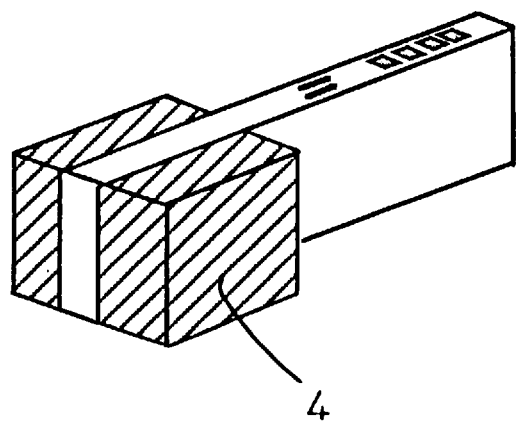

As for the configuration of the semiconductor acceleration sensor of FIG. 13, there is a rectangular parallelepiped body formed with piezoresistors 2, output terminals 8, etc. which body is cut out from a semiconductor wafer 10. This body is hereinafter called a sensor element. A weight 4 is bonded to the sensor element 1. Bumps 3 for making electrical contact with a support 24 are formed on the output terminals 8. The bumps 3 are gold or solder bumps 3. A manufacturing method will be described in detail with reference to FIGS. 19. Piezoresistors 2 and output terminals 8 are patterned on the surfaces of a semiconductor wafer 10 in FIG. 19A, and then the semiconductor wafer 10 is so cut that the piezoresistors 2 and the output terminals 8 exist in the same plane. Thus, a rectangular parallelepiped sensor element 1 in FIG. 19B is obtained. Finally, weights 4 are bonded to the rectangular parallelepiped sensor element 1 in FIG. 19C. The semiconductor wafer 10 may be cut by dicing. The dicing is performed such that lines along which to scribe the sensor element 1 are formed to define its outline, and the semiconductor wafer 10 is cut by dicing with the scribe lines used as a reference. The semiconductor sensors 1 are arranged in the semiconductor wafer 25.

In this embodiment, an element for low acceleration was manufactured. The low acceleration means 1 to 2 G (1 G=9.8 m/s$^2$). As for the dimensions of the entire element, the length was 9 mm (L1=6 mm, L2=3 mm), the width W was 0.6 mm, and the height Z was 0.1 mm. Incidentally, acceleration sensors for low acceleration are used for earthquake detection, virtual reality, etc.

The sensor element 1 formed with the weights 4 is fixed to a support 24 that is constituted of a semiconductor integrated circuit substrate 110. Since the output voltage of the sensor element 1 formed with the weights 4 is small, the semiconductor integrated circuit substrate 110 is given a signal processing function such as an amplifier circuit 111. Terminals are formed on the semiconductor integrated circuit substrate 10 to fix the sensor element 1 to the semiconductor integrated circuit substrate 110 as well as to take electrical contact between the bumps 3 of the output terminals 8 of the sensor element 1 and the semiconductor integrated circuit element 110. The sensor element 1 is composed of the portion that swings in response to acceleration and the fixed portion. To avoid influences of torsion and the like, a base may be attached to the fixed portion to reinforce it. In this embodiment, a reinforcing base 138 is used. To strongly fix the reinforcing base 138, gold is patterned in advance in the fixing area of the semiconductor integrated circuit substrate 110. As for the joining method, electrical connections are established by a method using an anisotropic conductive film 120. The anisotropic conductive film 120 is an adhesive in which small conductive particles are dispersed. Through thermo-compression bonding, particles are interposed between electrode, to establish electrical conduction while insulation between adjacent electrodes is secured. Further, mechanical joining is effected when the adhesive sets. According to this method, conduction between the bumps 3 of the output terminals 8 of the sensor element 1 and the terminals of the semiconductor integrated circuit substrate 110 as the support 24 is obtained.

A specific fixing method will be described below with reference to FIGS. 18. FIGS. 18 include front views on the left-hand side and side views on the right-hand side. In FIG. 18A an anisotropic film 120 is bonded to the output terminals 8 of the semiconductor integrated circuit substrate 110. At this time, the anisotropic conductive film 120 may be used to fix the reinforcing base to a land that is provided in the semiconductor integrated circuit.

In FIG. 18B the sensor element 1 is mounted from above so that the bumps 3 of the sensor element 1 are opposed to the output terminals 8 of the semiconductor integrated circuit substrate 110, and weight, which is about 100 kgf/cm for the bump 3, is applied from above the sensor element 1. By performing reflow at 200° C. while applying weight, the anisotropic conductive film 120 is completely fixed and electrical connections between the sensor element 1 and the semiconductor integrated circuit are obtained. FIG. 18C shows a state that the electrical connections are obtained.

Among other fixing methods are a fixing method of melting solder bumps 3, and a method in which connection is effected by gold-gold eutectic connection.

In the case of using the solder bumps 3, the bumps 5 of the output terminals 8 of the sensor element 1 are opposed to the semiconductor integrated circuit substrate 110. The base is temporarily fixed, in advance, to the land of the semiconductor integrated circuit substrate 10. By melting the solder portions by reflow at 200° C., electrical and mechanical connections are attained.

In the cases of utilizing an eutectic connection, the eutectic connection is effected by pressurizing and heating at 500° C.

Figure 14:
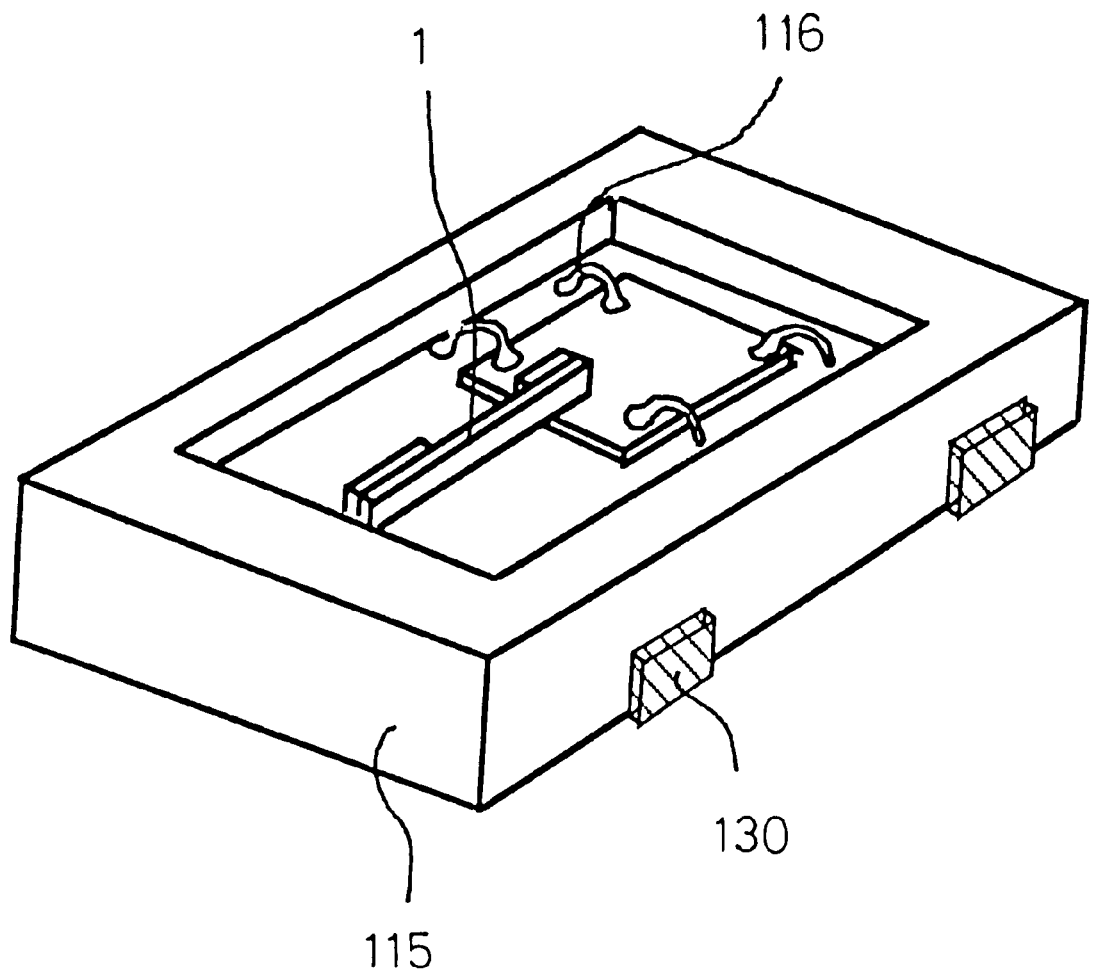
FIG. 14 is a perspective of a package of a semiconductor acceleration sensor according to the invention.
Figure 15:
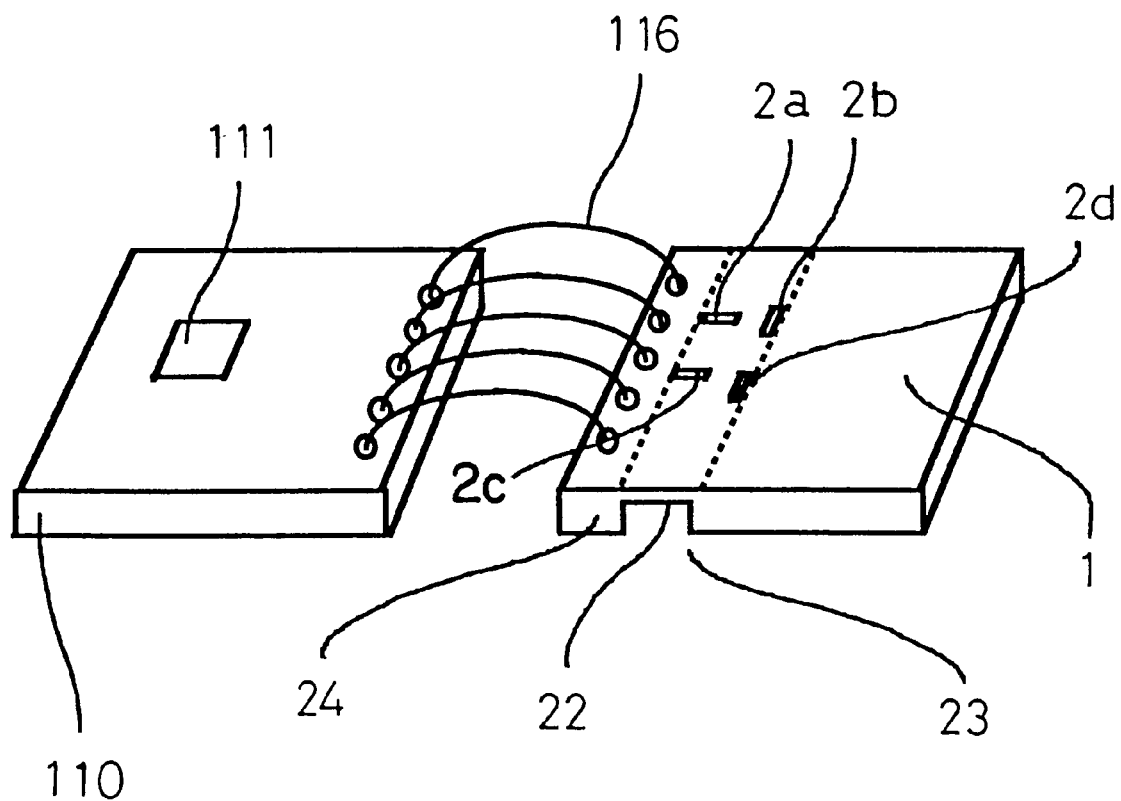
FIG. 15 is a perspective view showing the configuration of a conventional semiconductor acceleration sensor.

The semiconductor integrated circuit substrate 110 thus produced is packaged in a case 115 as shown in FIG. 14. To make electrical conduction with external leads 130, wires 116 are connected by bonding. The case 115 is made of ceramics, plastic, or the like. This embodiment uses a case 115 that enables surface mounting. Finally, a lid is provided on the surface. This embodiment uses a glass lid, to allow passage of laser light for trimming (the semiconductor integrated circuit substrate 110 has trimming circuits). In come cases, oil is injected to improve impact resistance and frequency characteristics.

This embodiment uses the rectangular parallelepiped sensor element 1. As a result, horizontal acceleration can easily be detected by fixing the sensor element 1 to the semiconductor integrated circuit substrate 110. Where the sensor is used in a vehicle, for instance, in an air-bag system for impact detection, the above structure provides the greatest advantage that there is no need for cumbersome work such as a consideration of the mounting method, because the sensor is directed to the detecting direction.

As for the characteristics of the sensor element 1, noise has been reduced as compared to the conventional method in which the sensor element is connected to the external semiconductor integrated circuit 110 for signal processing. Further, the incorporation of the semiconductor integrated circuit substrate 110 for signal processing in the case 115 has provided a size merit.

In the semiconductor acceleration sensor of the invention, the semiconductor integrated circuit substrate 110 for signal processing also serves as the support 24 rather than being provided externally as in the conventional case, and is connected to the sensor element 1 through the bumps 3. As a result, noise has been reduced and cost reduction has been attained by the size effect. When the semiconductor acceleration sensor of the invention was mounted in a vehicle, that is, used as an air-bag-operating sensor for lifesaving at the time of collision, the desired characteristics were obtained and the sensor was well within the range suitable for actual use.

Having the above-described constitution, the invention provides the following advantages:

(1) Even if torsional stress is received, the acceleration sensor element can cancel it. This allows manufacture of a highly accurate sensor having superior other-axis sensitivity characteristics.

(2) Since the influences of torsion can be eliminated, the manufacturing process can be simplified, enabling cost reduction.

(3) By using the semiconductor integrated circuit substrate as the support, a cost reduction effect is obtained.

(4) Since electrical connections between the sensor element and the semiconductor integrated circuit substrate are effected through the bumps, noise can be reduced. Further, since the semiconductor integrated circuit substrate is the support, it is less likely affected by vibration.

(5) Highly accurate devices can be supplied.

(6) Horizontal acceleration can easily be detected because the sensor element is a rectangular parallelepiped and hence the acceleration detecting direction is parallel with the surface of the semiconductor integrated circuit substrate.

(7) Since no weights are added in a later step, the element having the weights can be manufactured with high positional accuracy.

(8) The weights can be mounted on the sensor element in the vicinity of its center of gravity.

What is claimed is:

1. A semiconductor acceleration sensor comprising: a semiconductor substrate having a first surface for receiving an acceleration force and a pair of second opposite surfaces disposed generally perpendicular to the first surface; detecting means disposed on the pair of second opposite surfaces of the semiconductor substrate for detecting a displacement of the semiconductor substrate due to an acceleration force applied to the first surface of the semiconductor substrate, the detecting means comprising a pair of bridge circuits respectively disposed on the second opposite surfaces of the semiconductor substrate, each of the bridge circuits comprising a plurality of piezoresistors; averaging means for averaging electrical signals outputted by the bridge circuits to thereby cancel resistance variations of the piezoresistors caused by torsion due to an acceleration applied to the first surface of the semiconductor substrate; and support means for supporting and fixing the semiconductor substrate.

2. A semiconductor acceleration sensor comprising: a sensor element cut from a semiconductor wafer having a detecting section for detecting a displacement of the sensor element due to an acceleration force applied to a surface of the sensor element, the detecting section being disposed on opposite surfaces of the sensor element other than the surface which receives the acceleration force, the detecting section comprising a pair of bridge circuits respectively disposed on the opposite surfaces of the sensor element, each of the bridge circuits comprising a plurality of piezoresistors; an averaging section for averaging electrical signals outputted by the bridge circuits to thereby cancel resistance variations of the piezoresistors caused by torsion due to an acceleration applied to the surface of the sensor element; and a support for supporting and fixing the sensor element.

* * * * *